United States Patent [19]

Pellhammer et al.

[11] Patent Number: 4,601,819
[45] Date of Patent: Jul. 22, 1986

[54] SORTING APPARATUS FOR FIBER STOCK, ESPECIALLY FOR MANUFACTURING PAPER

[75] Inventors: Maurus Pellhammer, Ravensburg; Wolfgang Siewert, Ravensburg-Weingartshof, both of Fed. Rep. of Germany

[73] Assignee: Escher W GmbH, Ravensburg/Württ, Fed. Rep. of Germany

[21] Appl. No.: 618,931

[22] Filed: Jun. 8, 1984

[30] Foreign Application Priority Data

Jun. 14, 1983 [CH] Switzerland ............... 3253/83

[51] Int. Cl.⁴ .................. B07B 1/20; B01D 33/36; D21C 7/08
[52] U.S. Cl. ................ 209/273; 209/250; 209/283; 209/379; 209/306; 209/389; 210/415; 162/251
[58] Field of Search ............ 209/273, 283, 379, 384, 209/385, 293, 294, 296, 299, 300, 305, 306, 304, 358, 389, 250; 210/413, 415, 785; 162/55, 251

[56] References Cited

U.S. PATENT DOCUMENTS

| 3,499,528 | 3/1970 | Solomon | 209/389 X |
| 4,347,134 | 8/1982 | Svehaug | 210/415 X |
| 4,396,502 | 8/1983 | Justus | 210/415 X |

Primary Examiner—S. Leon Bashore
Assistant Examiner—Thomas M. Lithgow
Attorney, Agent, or Firm—Werner W. Kleeman

[57] ABSTRACT

The sorting apparatus contains a screen forming at least part of a circular-cylindrical surface and a rotor having a rotor shaft which is coaxially located at the lengthwise axis defined by the circular-cylindrical surface. The rotor possesses clearing blades and propelling blades arranged to follow or trail the clearing blades as seen in the rotary direction of the rotor. The clearing blades each comprise a front-positioned clearing edge which moves along the screen and a run-up surface which is inclined relative to a radial direction defined by the rotor. The run-up surface moves the fiber stock in a direction towards the rotor shaft and provides an open through-passage in the central region of the rotor. The propelling blades extend from the rotor shaft towards the screen and terminate at a distance from the surface defined by the screen.

13 Claims, 11 Drawing Figures

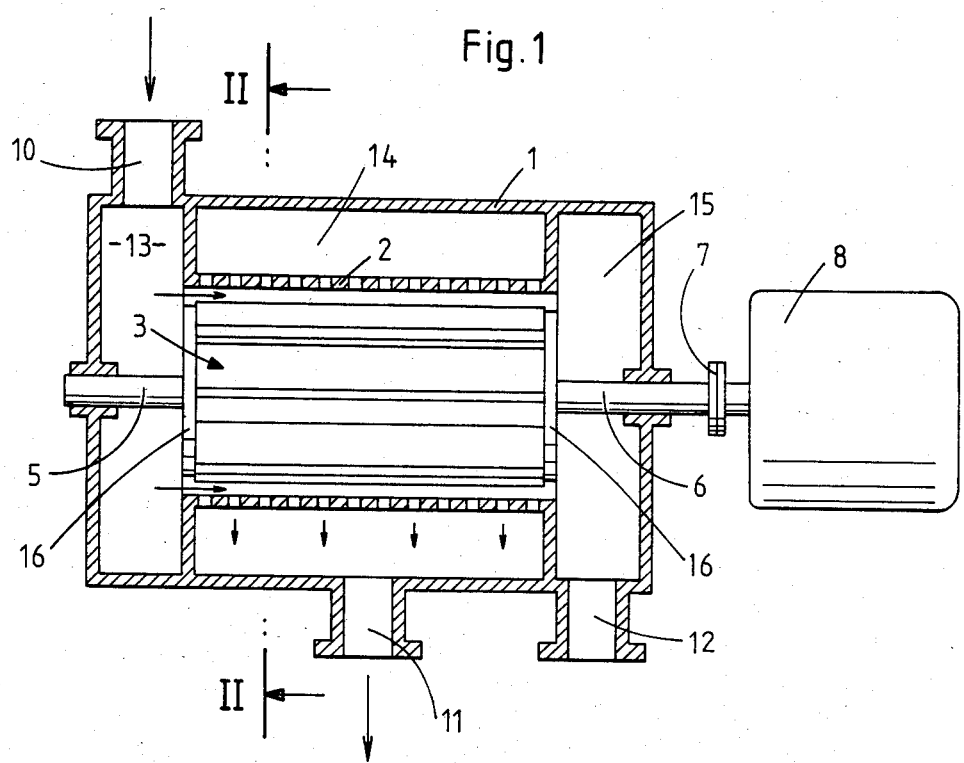
Fig. 1
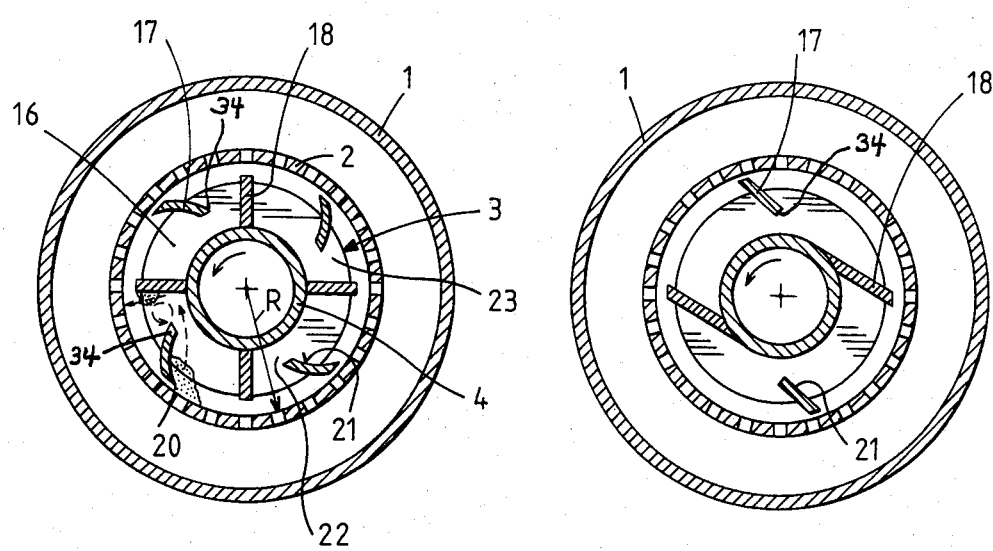
Fig. 2
Fig. 3

SORTING APPARATUS FOR FIBER STOCK, ESPECIALLY FOR MANUFACTURING PAPER

CROSS REFERENCE TO RELATED APPLICATION

This application is related to the commonly assigned, copending U.S. application Ser. No. 06/540,888, filed Oct. 11, 1983, entitled "Method for Sorting Fiber Stock, Especially for Manufacturing Paper, and Sorting Apparatus for the Performance of Such Method."

BACKGROUND OF THE INVENTION

The present invention relates to a new and improved sorting apparatus for fiber stock, especially for manufacturing paper.

In its more particular aspects, the present invention relates specifically to a new and improved sorting apparatus for fiber stock, especially for manufacturing paper, which includes a screen or sieve forming at least part of a substantially circular-cylindrical surface and a rotor containing a rotor shaft which is coaxially located at the lengthwise axis defined by the circular-cylindrical surface and which possesses at least one vane or blade.

Sorting apparatuses of the aforementioned type which are known in the art have a tube-shaped cylindrical screen or sieve along which moves a rib-shaped or ledge-shaped member which is connected to the rotor. This member serves the purpose of breaking up or loosening, by means of pressure pulsations, the layer of fiber stock which is formed at the screen or sieve and to thereby maintain such screen or sieve in a pervious or permeable state.

For use with fiber stock of higher consistency from which flat or areal contaminants are intended to be removed as in the case of, for example, fiber stock obtained from waste paper and containing pieces of foil, there has been proposed an apparatus in which the screen or sieve assumes the shape of only a semi-cylindrical trough forming one part of a housing. The rotor of such apparatus contains radial vanes or blades, namely smaller length propelling vanes or blades and greater length clearing or cleaning vanes or blades.

SUMMARY OF THE INVENTION

Therefore, with the foregoing in mind it is a primary object of the present invention to provide a new and improved sorting apparatus for fiber stock, especially for manufacturing paper, which is suited to process fiber stocks of higher consistencies.

Another and more specific object of the present invention is directed to the provision of a new and improved sorting apparatus for fiber stock, especially for manufacturing paper, which in comparison to the known apparatus provides an increased output and consumes less energy.

Now in order to implement these and still further objects of the invention, which will become more readily apparent as the description proceeds, the sorting apparatus of the present development is manifested by the features that, the rotor is provided with at least one clearing or cleaning vane or blade comprising a front-positioned or forward clearing or cleaning edge which moves along the screen or sieve and a run-up or ramp surface which is contiguous to the front-positioned or forward clearing or cleaning edge and which is inclined relative to the radial direction of the rotor. The run-up or ramp surface is suited to move the fiber stock in a direction towards the rotor shaft and terminates at a distance from the rotor shaft in such a manner that the clearing or cleaning vane or blade leaves an open through-passage or window in the central region of the rotor. At least one propelling vane or blade follows or trails the clearing or cleaning vane or blade as seen in the rotary direction of the rotor. The propelling vane or blade extends from the rotor shaft towards the screen or sieve and terminates at a distance from the filter surface defined by the screen.

In the sorting apparatus according to the invention the clearing or cleaning vane or blade continuously lifts the fiber layer or web located on the screen or sieve and containing contaminants which are to be separated therefrom. The taken-up fiber layer or web is then displaced in a direction towards the rotor shaft. The taken-up fiber stock mass passes through the open through-passage or window into an intermediate space between the clearing or cleaning vane or blade and the propelling blade following or trailing the same. This fiber stock mass impinges upon the propelling vane or blade which throws such fiber stock mass again towards the screen or sieve. During such movement the fiber stock mass is subjected to an intensive turbulence or agitation and is broken-up or loosened while the screen or sieve is simultaneously kept free or cleared.

The clearing or cleaning vane or blade in the sorting apparatus according to the invention may extend from the filter surface defined by the screen or sieve to a maximum of substantially half the screen or sieve radius. The propelling vane or blade, on the other hand, may extend from the region of the rotor shaft to a minimum distance of substantially 1 cm from the filter surface defined by the screen or sieve.

Preferably, the inner end of the clearing or cleaning vane or blade can be positioned closer to the rotor shaft than the outer end of the propelling vane or blade.

By such measures there is achieved an improved pick-up and agitation of the fiber stock mass during the rotational movement of the rotor.

Preferably, there can be a provided at the rotor a number of clearing or cleaning vanes or blades which are offset from each other in circumferential direction. In such arrangement each one of the clearing or cleaning vanes or blades is followed or trailed by a propelling vane or blade as seen in the rotary direction of the rotor.

In the inventive sorting apparatus preferably the clearing blades or the clearing blade, respectively, can be provided with agitation elements for agitating or subjecting to turbulence the fiber stock suspension. The agitation elements may be formed by sections of the clearing blade which are located at a rim portion of such clearing blade which is remote from the screen or sieve. These sections may have a shape which deviates from the shape of the run-up or ramp surface.

For example, the sections may be cut and alternatingly bent over from the two sides of the run-up or ramp surface. These sections also may be designed in the manner of a battlement or a tine-like structure. In both the aforementioned cases there is obtained a turnover or re-layering of the fiber stock mass prior to the successive agitation of the same.

However, the sections also may be twisted through a predetermined angle relative to the run-up or ramp surface. The run-up or ramp surface also can be provided with cam-like projections or dogs. In both these cases there is achieved a turn-over or re-layering of the fiber stock mass in the axial direction of the rotor.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein:

FIG. 1 is a longitudinal section through a first embodiment of the sorting apparatus according to the invention;

FIG. 2 is a cross-section taken substantially along the line II—II in FIG. 1;

FIG. 3 shows a cross-section corresponding to FIG. 2 through a second embodiment of the sorting apparatus according to the invention;

DETAILED DESCRIPTION OF THE PREFERRED EMBODIMENTS

Figure 4:
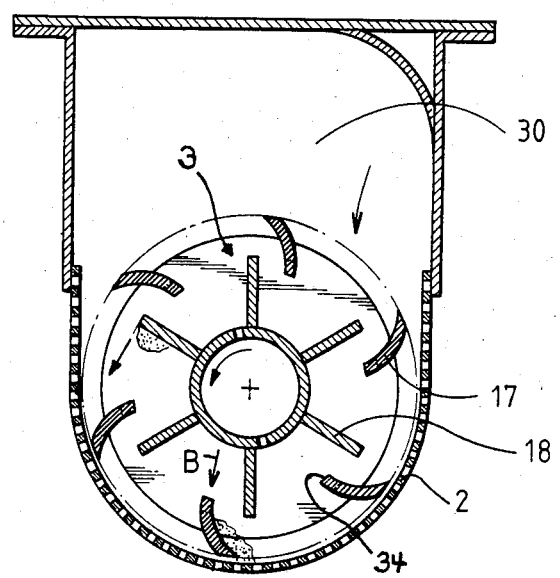
FIG. 4 is a cross-section through a third embodiment of the sorting apparatus according to the invention having a differently shaped housing.

Describing now the drawings, it is to be understood that only enough of the construction of the sorting apparatus has been shown as needed for those skilled in the art to readily understand the underlying principles and concepts of the present development, while simplifying the showing of the drawings. Turning attention now specifically to FIGS. 1 and 2, there has been illustrated a first embodiment of the sorting apparatus according to the invention. Such sorting apparatus comprises a housing 1 in which there is located a tube-shaped substantially cylindrical screen or sieve 2 defining a screen lengthwise axis. A rotor 3 is substantially coaxially journaled relative to the screen or sieve 2 and comprises a substantially tube-shaped rotor shaft 4. From both ends of the rotor shaft 4 there extend related studs or journals 5 and 6 which are both rotatably journaled in the housing 1. The stud or journal 6 is connected to a suitable drive motor 8 by means of a flange 7 or equivalent connection facility. The housing 1 is provided with an infeed or inlet 10 for the fiber stock to be sorted, an outfeed or outlet 11 for the useful material or good stock as well as with a further outfeed or outlet 12 for the contaminants or rejects which have not passed through the screen or sieve 2. The infeed or inlet 10 leads to an infeed space or chamber 13 and the outfeed or outlet 11 leads to the exterior from a space or chamber 14 which receives the good stock or material and surrounds the screen or sieve 2. The further outfeed or outlet 12 is connected to a space or chamber 15 which receives the rejects and which communicates with the not particularly referenced interior space or chamber of the screen or sieve 2.

As will be further evident from FIGS. 1 and 2, the rotor 3 of this first embodiment of the sorting apparatus illustrated therein is provided with two disks or plates 16 at which there are mounted or secured clearing or cleaning vanes or blades 17. The rotor 3 is additionally provided with substantially radial propelling vanes or blades 18 which also extend between these disks or plates 16 but extend radially outwardly from the rotor shaft 4. The clearing or cleaning blades 17 and the propelling blades 18 are circumferentially distributed about the rotor shaft 4.

The clearing or cleaning blades 17 contain a front or forwardly positioned clearing or cleaning edge 20 which, during rotation of the rotor 3, moves along the filter surface, here the inner surface of the screen or sieve 2. A run-up or ramp surface 21 follows the front or forwardly positioned clearing or cleaning edge 20. This run-up or ramp surface 21 is rearwardly inclined with respect to the radial direction of the rotor 3 and in consideration of the rotational direction thereof. The inclination is such that the run-up or ramp surface 21 is suited to displace the fiber stock in a direction towards the rotor shaft 4 of the rotor 3. The inner end or rim portion 34 of the clearing or cleaning vane or blade 17 is closer to the rotor shaft 4 than the outer end defined by the clearing or cleaning edge 20 of the clearing blade 17.

As will be particularly evident from FIG. 2, each such clearing blade 17 extends from the screen 2 to a maximum of substantially half the radius R of the screen or sieve 2. In this manner each such clearing blade 17 leaves an open through-passage or window 22 in the central region of the rotor 3. Through this through-passage or window 22 the fiber stock mass can pass into an intermediate space 23 which is located between each such clearing blade 17 and the propelling blade 18 following the same.

A second embodiment of the sorting apparatus according to the invention is illustrated by FIG. 3 and differs from the embodiment shown in FIG. 2 through the provision of only two clearing or cleaning vanes or blades 17 and two propelling vanes or blades 18 at the rotor 3. The propelling vanes or blades 18 are not radially arranged as in the first embodiment as shown in FIG. 2 but are rearwardly inclined relative to the rotary direction of the rotor 3. While in the first embodiment illustrated by FIG. 2 the run-up or ramp surfaces 21 of the clearing blades 17 are domed or curved, the run-up or ramp surfaces 21 of the clearing blades 17 are planar in the second embodiment shown in FIG. 3. While, on the one hand, domed vanes or blades have the advantage of higher rigidity, planar vanes or blades can be more readily manufactured, on the other hand.

It will be self-evident that the first embodiment as illustrated by FIG. 1 may also have more than two disks or plates 16. On the other hand, such disks or plates 16 may be omitted in the case that the clearing vanes or blades 17 are differently mounted as, for example, at radially extending arms supported by the rotor shaft 4.

A third embodiment of the inventive sorting apparatus is shown in FIG. 4 which illustrates the utilization of the inventive concept to a sorting apparatus of the type as described, for example, by German Patent Publication No. 3,238,742. In this third embodiment the screen or sieve 2 is not configured in the shape of a tube but assumes the shape of a substantially semi-cylindrical trough or vat which is followed by substantially planar sidewalls of essentially vertical upward extension. Above the rotor 3 which is designed in the same manner as shown and described with respect to the first and second embodiments and as respectively illustrated in FIGS. 2 and 3, there is present an air space or chamber 30 into which the to-be-sorted fiber stock suspension is propelled whereafter the same drops back onto the rotor 3 and the screen or sieve 2. Otherwise the mode of operation of the clearing or cleaning vanes or blades 17 and of the propelling vanes or blades 18 is the same as in the other embodiments described hereinbefore.

Figure 5:
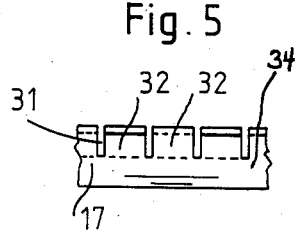
FIGS. 5, 7, 9 and 11 are front views of clearing or cleaning vanes or blades provided with differently shaped agitation elements.
Figure 6:
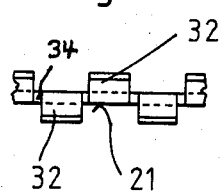
FIGS. 6, 8 and 10 are end views of the clearing or cleaning vanes or blades shown in FIGS. 5, 7 and 9, respectively, as viewed in the direction of the arrow B in FIG. 4.

FIG. 5 illustrates in a frontal view a possible design of the clearing or cleaning vane or blade 17, while FIG. 6 shows the associated end view in the direction of the arrow B in FIG. 4. According to FIGS. 5 and 6 the clearing or cleaning vane or blade 17 is provided with cuts 31 at its rim portion 34 which is remote from the screen or sieve 2. These cuts 31 separate sections or end sections 32 from each other. As will be particularly evident from FIG. 6, these sections 32 are alternatingly bent over from the two sides of the run-up or ramp surface 21.

Figure 7:
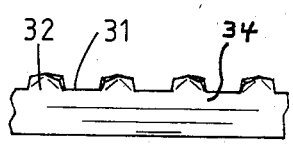
Figure 8:
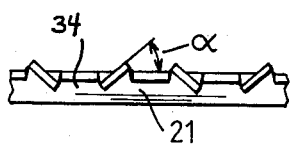
Figure 11:
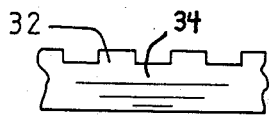

In the design shown in FIGS. 7 and 8 the cuts 31 form recesses of a width such that the end sections 32 are formed in the manner of a battlement or tine-like structure. The same is true for a further design of the clearing or cleaning vane or blade 17 as illustrated by FIG. 11. In the design shown in FIG. 7 and the associated FIG. 8 the end sections 32 are twisted through a predetermined angle or relative to the run-up or ramp surface 21.

Figure 9:
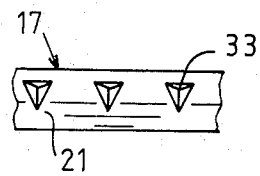
Figure 10:
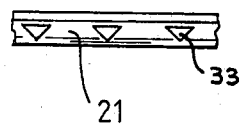

Finally, in the modified design illustrated by FIGS. 9 and 10, cam-like projections or dogs 33 of substantially triangular cross-section are mounted or secured to the run-up or ramp surface 21 of the clearing vane or blade 17.

While there are shown and described present preferred embodiments of the invention, it is to be distinctly understood that the invention is not limited thereto, but may be otherwise variously embodied and practiced within the scope of the following claims.

Accordingly, what we claim is:

1. A sorting apparatus for fiber stock, especially for manufacturing paper, comprising:
    a screen forming at least part of a substantially circular-cylindrical surface and defining an axis;
    a rotor driveable for rotation in a predetermined rotary direction and comprising a rotor shaft which is coaxially located substantially at said axis defined by said screen;
    said rotor defining a substantially axial direction, a substantially radial direction and having a substantially central region;
    at least one clearing blade;
    mounting means containing at least two mounting members arranged at a predetermined mutual distance in said substantially axial direction at said rotor;
    said at least one clearing blade being mounted at and extending between said at least two mounting members;
    said at least one clearing blade comprising a forwardly positioned clear edge which, during rotation of said rotor, is moved along said screen;
    said at least one clearing blade further comprising a run-up surface which is contiguous with said forwardly positioned clearing edge;
    said run-up surface extending at an angle relative to said substantially radial direction of said rotor and thereby serving to displace the fiber stock taken up by said at least one clearing blade during rotation of said rotor, in a direction towards said rotor shaft, and said run-up surface terminating at a predetermined distance from said rotor shaft such that said at least one clearing blade leaves an open through-passage in said central region of said rotor;
    at least one propelling blade;
    said at least one propelling blade extending between said at least two mounting members and following said at least one clearing blade with respect to said predetermined rotary direction of said rotor; and
    said at least one propelling blade extending from said rotor shaft towards said screen and terminating at a predetermined distance therefrom.

2. The sorting apparatus as defined in claim 1, wherein:
    said screen defines a radius; and
    said at least one clearing blade extending from said screen to a maximum distance amounting to substantially half said radius of said screen.

3. The sorting apparatus as defined in claim 1, wherein:
    said at least one propelling blade extends from the region of said rotor shaft towards said screen to a minimum distance of substantially 1 cm therefrom.

4. The sorting apparatus as defined in claim 1, wherein:
    said at least one clearing blade defines an inner end;
    said at least one propelling blade defines an outer end; and
    said inner end of said at least one clearing blade is positioned closer to said rotor shaft than said outer end of said at least one propelling blade.

5. The sorting apparatus as defined in claim 1, wherein:
    a predetermined number of the clearing blades are provided which are circumferentially distributed about said rotor;
    a predetermined number of the propelling blades are provided which are circumferentially distributed about said rotor; and
    each one of said propelling blades following a related one of said clearing blades in said predetermined rotary direction of said rotor.

6. The sorting apparatus as defined in claim 1, wherein:
    said at least one clearing blade is provided with agitation elements for agitating a fiber stock suspension present in the sorting apparatus.

7. The sorting apparatus as defined in claim 6, wherein:
    said at least one clearing blade comprises a rim portion located remote from said screen; and
    said agitation elements being formed by sections of said at least one clearing blade which are located at said rim portion and which differ in shape from the shape of said run-up surface of said at least one clearing blade.

8. The sorting apparatus as defined in claim 7, wherein:
    said run-up surface defines two sides; and
    said sections at said rim portion of said clearing blade being cut out and alternatingly bent over from said two sides of said run-up surface.

9. The sorting apparatus as defined in claim 7, wherein:
    said sections are configured to define a substantially tine-like structure.

10. The sorting apparatus as defined in claim 9, wherein:

said sections are twisted through a predetermined angle relative to said run-up surface.

11. The sorting apparatus as defined in claim 6, wherein:

said agitation elements are formed by cam-like projections projecting from said run-up surface.

12. The sorting apparatus as defined in claim 1, wherein:

said at least two mounting members of each of said mounting means constitute at least two common mounting members for conjointly mounting said at least one clearing blade.

13. The sorting apparatus as defined in claim 12, wherein:

each one of said at least two common mounting members constituting a disk secured to said rotor.

* * * * *

UNITED STATES PATENT AND TRADEMARK OFFICE
CERTIFICATE OF CORRECTION

PATENT NO. : 4,601,819
DATED : July 22, 1986
INVENTOR(S) : MAURUS PELLHAMMER and WOLFGANG SIEWERT It is certified that error appears in the above—identified patent and that said Letters Patent is hereby corrected as shown below:

In the Abstract of the Disclosure, line 9, after the word "surface" please insert --which is contiguous to the front-positioned clearing edge and--

Signed and Sealed this

Twenty-third Day of December, 1986

Attest:

DONALD J. QUIGG

*Attesting Officer*     *Commissioner of Patents and Trademarks*